No. 709,093. Patented Sept. 16, 1902.
H. R. HOWE.
MILK OR CREAM DEODORIZER.
(Application filed Nov. 11, 1901.)
(No Model.)
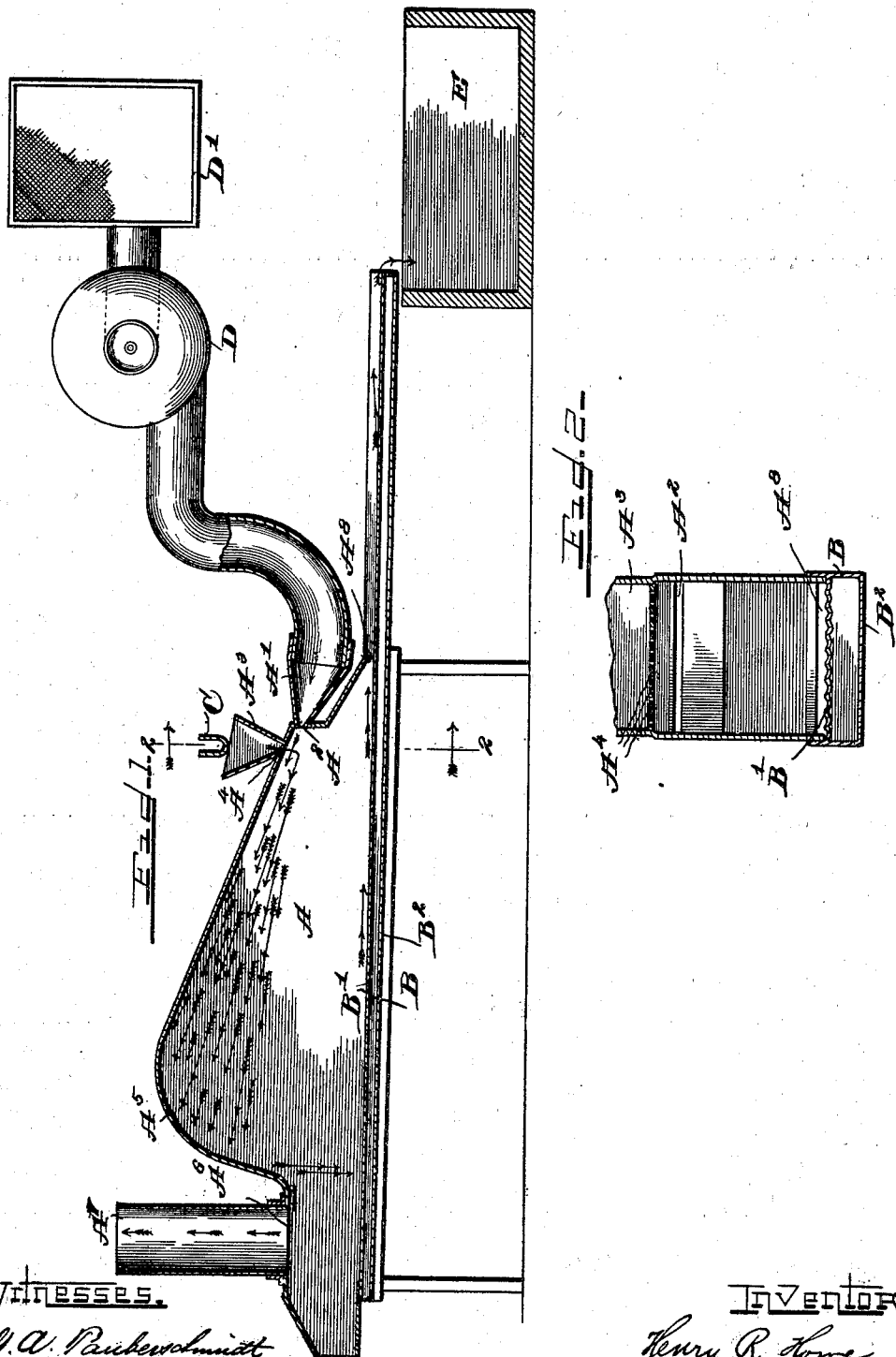

UNITED STATES PATENT OFFICE.

HENRY R. HOWE, OF ROCKFORD, ILLINOIS, ASSIGNOR OF ONE-HALF TO HENRY W. CARMICHAEL, OF ROCKFORD, ILLINOIS.

MILK OR CREAM DEODORIZER.

SPECIFICATION forming part of Letters Patent No. 709,093, dated September 16, 1902.

Application filed November 11, 1901. Serial No. 81,883. (No model.)

*To all whom it may concern:*

Be it known that I, HENRY R. HOWE, a citizen of the United States, residing at Rockford, in the county of Winnebago and State of Illinois, have invented certain new and useful Improvements in Milk or Cream Deodorizers, of which the following is a specification.

It is a well-known fact that milk readily absorbs the impurities and odors to which it is exposed, and dealers who buy the product of several different dairies frequently are subjected to annoyance and financial loss through the carelessness of, perhaps, a single dairyman, who permits that part of the milk which he contributes to become contaminated. As all of the milk or the cream from it usually is mixed before its shipment, the contamination of a part is communicated to the whole.

The object of this invention is the production of an apparatus for deodorizing and purifying milk and cream by subjecting it in detail to an air-blast sufficiently strong to atomize it or at least to separate its particles quite thoroughly.

In the accompanying drawings, Figure 1 is a central longitudinal section through the apparatus of my invention. Fig. 2 is a transverse vertical section on dotted line 2 2 of Fig. 1.

Like letters of reference indicate corresponding parts throughout the views.

In the embodiment herein shown of this invention I provide a chamber or drum having an air-inlet and an air-outlet, also having a milk or cream inlet and an outlet therefor. Into this drum through the air-inlet I introduce a strong blast of filtered air, which air escapes from the drum through the air-outlet. The milk or cream inlet is so located with reference to the air-inlet that as the liquid enters the interior of the drum in several fine streams it is struck by the air-blast, practically atomized, and after being driven across the interior of the drum is thrown violently against an impinging surface within the drum. The force of its impact upon said impinging surface, assisted by the pressure of the continuing blast, condenses the atomized or finely-separated liquid, after which it falls into an inclined water-jacketed trough, by which it is conducted to a receiving can or tank. The gaseous impurities from which the milk is freed escape from the drum through the air-outlet.

In the construction of this deodorizer and purifier I provide the drum A, preferably constructed from sheet metal. The bottom of the drum is formed in this instance by a water-jacketed cooling-tank, to be later herein described. Near the forward end of the drum I place a funnel A', communicating with the interior thereof for the reception of the air-blast. This funnel is flattened where it joins the drum and is inclined upward slightly, the top of the drum rising at about the same angle of inclination. The opening $A^2$ from the funnel into the drum is narrowed and longitudinally elongated. In the upper side of the drum, and directly in front of the opening $A^2$ of the funnel A' into said drum, I provide a funnel $A^3$ for the milk or cream, which is directed to said funnel $A^3$ by means of a pipe or trough from an elevated tank or a separator. The bottom of the funnel $A^3$ is provided with the minute openings $A^4$ for admitting the liquid to be placed in the funnel into the drum A in fine streams. Near the rear end of the drum the upper wall thereof curves downward, forming a curved impinging surface $A^5$ for the reception of the atomized or finely-separated milk or cream and the air-blast to be later mentioned herein. At the bottom and rearward of this curved surface I provide the air-outlet opening $A^6$, from which rises the outlet-pipe $A^7$. The rear end of the drum A is closed, but at its forward end, at a point below the air-inlet opening, I have provided a narrow opening $A^8$ for the escape of the liquid after it has been treated.

B is the bottom of the drum A. As before stated, it is herein shown as formed with double walls B' and $B^2$ for water-jacketing it. The water-jacket is adapted to have a circulation of cold water, and the upper wall B' is corrugated in order to present a greater cooling-surface to the milk or cream which falls upon it. It is apparent that the bottom of the drum A might be made of a single thickness of metal, the water-jacket being omitted.

C is the spout for conveying cream from the separator or milk from an elevated tank to the funnel $A^3$.

D is a rotatory fan or blower, and D' an air-filter, the latter comprising a filter-box one or more of the sides of which are covered with or composed of dampened fabric. The air for the air-blast may be purified in any other suitable manner and may be cooled if it is desirable to lower the temperature of the milk or cream to be deodorized. It is also clear that the air might be medicated or a gas (as oxygen) added to it were it desirable to treat the milk or cream or any other liquid in such manner.

E is the receiving-tank for the deodorized milk or cream.

The device hereinbefore described is a very efficient cooler for milk and cream or for other liquids.

It is obvious that many changes might be made in the apparatus herein shown and described without departing from the spirit of my invention. I therefore desire to have it understood that I do not intend to limit myself to the exact form of apparatus herein set forth.

I claim as my invention—

1. In an apparatus for deodorizing milk or cream, in combination, a closed drum having an air-inlet opening, an air-outlet opening, and a liquid-inlet opening; means for producing a strong current of air through the air-inlet opening; and an imperforate impinging surface for said liquid and said air-current.

2. In an apparatus for deodorizing milk or cream, in combination, a closed drum having an air-inlet opening, an air-outlet opening, a liquid-inlet opening, and a liquid-outlet opening; means for producing a strong current of air through the air-inlet opening; and an imperforate impinging surface for said liquid and said air-current.

3. In an apparatus for deodorizing milk or cream, in combination, a closed drum having an air-inlet opening in one side thereof, an air-outlet opening in its opposite side, and a liquid-inlet opening near said air-inlet opening; an imperforate impinging surface within said drum opposite said air-inlet opening; and means for producing a strong current of air through the air-inlet opening.

4. In an apparatus for deodorizing milk or cream, in combination, a closed drum having an air-inlet opening near one side thereof, an air-outlet opening in its opposite side, and a liquid-inlet opening adjacent to said air-inlet opening, one wall of said drum being curved to form an impinging surface for the liquid; and means for producing a strong current of air through the air-inlet opening.

5. In an apparatus for deodorizing milk or cream, in combination, a closed drum having an air-inlet opening in one side thereof, an air-outlet opening near the opposite side of said drum, and a liquid-inlet opening adjacent to said air-inlet opening, said liquid-inlet opening comprising a number of fine perforations through the wall of said drum; a pipe for said outlet-opening; the upper wall of said drum being inclined upward at the forward side of the drum and curved downward near the rear side thereof, said curved portion of the upper wall constituting within the drum an impinging surface for the liquid; and means for producing a strong current of air through the air-inlet opening.

HENRY R. HOWE.

Witnesses:
L. L. MILLER,
L. C. CARMICHAEL.